United States Patent
Bakke et al.

(10) Patent No.: US 6,940,834 B2
(45) Date of Patent: Sep. 6, 2005

(54) METHOD FOR IMPROVING THE HANDING OVER A CONNECTION FROM ONE SGSN TO ANOTHER SGSN

(75) Inventors: Knut Bakke, Arendal (NO); Bjørn Holen, Arendal (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 850 days.

(21) Appl. No.: 09/730,877

(22) Filed: Dec. 5, 2000

(65) Prior Publication Data

US 2001/0019544 A1 Sep. 6, 2001

Related U.S. Application Data

(63) Continuation-in-part of application No. 09/222,444, filed on Dec. 29, 1998, now abandoned.

(30) Foreign Application Priority Data

Dec. 30, 1997 (NO) .......................................... 19976150

(51) Int. Cl.⁷ ................................................ H04Q 7/00
(52) U.S. Cl. ........................................ 370/331; 370/328
(58) Field of Search ................................ 370/331, 332, 370/333, 328; 455/438, 440, 442, 443, 444

(56) References Cited

U.S. PATENT DOCUMENTS

| | | | |
|---|---|---|---|
| 4,398,063 A | 8/1983 | Hass et al. | 455/442 |
| 5,146,609 A | 9/1992 | Tayloe et al. | 455/442 |
| 5,278,892 A | 1/1994 | Bolliger et al. | 455/442 |
| 5,291,544 A | 3/1994 | Hecker | 455/442 |
| 5,327,577 A | 7/1994 | Uddenfeldt | 455/442 |
| 5,384,826 A | 1/1995 | Amitay | 370/331 |
| 5,434,853 A | 7/1995 | Hemmady et al. | 370/331 |
| 5,434,854 A | 7/1995 | Focarile et al. | 370/331 |
| 5,471,644 A | 11/1995 | Schatz et al. | 455/442 |
| 5,487,065 A | 1/1996 | Acampora et al. | 370/331 |
| 5,590,125 A | 12/1996 | Acampora et al. | 370/329 |
| 5,682,416 A | 10/1997 | Schmidt et al. | 370/331 |
| 5,757,783 A | 5/1998 | Eng et al. | 370/410 |
| 5,850,607 A | 12/1998 | Muszynski | 455/442 |
| 5,883,888 A | 3/1999 | St-Pierre | 370/331 |
| 5,896,373 A | 4/1999 | Mitts et al. | 455/436 |
| 5,898,924 A | 4/1999 | Korpi et al. | 455/442 |
| 5,901,354 A | 5/1999 | Menich et al. | 455/442 |
| 5,940,371 A | 8/1999 | Mitts et al. | 370/331 |
| 5,940,762 A | 8/1999 | Lee et al. | 455/442 |
| 6,104,929 A * | 8/2000 | Josse et al. | 455/445 |
| 6,137,783 A * | 10/2000 | Sallberg | 370/316 |
| 6,320,873 B1 * | 11/2001 | Nevo et al. | 370/466 |
| 6,501,741 B1 * | 12/2002 | Mikkonen et al. | 370/310 |
| 6,529,497 B1 * | 3/2003 | Hjelm et al. | 370/347 |

FOREIGN PATENT DOCUMENTS

WO    WO 98/32303    *    7/1998    ............ H04Q/7/38

* cited by examiner

*Primary Examiner*—Duc Ho
*Assistant Examiner*—Thien D Tran

(57) ABSTRACT

A method and system (i) for improving the handing over of a connection from one SGSN (I) to another, i.e. when an MS (Mobile Station) moves from one SGSN service area to another, (ii) for not interrupting the packet transmission and possible layer 3 procedures, and (iii) for optimizing the network utilization without adding complexity to SGSN. Upon an inter SGSN routing area update, the old SGSN (I) is given the role as a temporary anchor, whereas the other (new) SGSN (II) is temporarily working as a serving SGSN.

24 Claims, 5 Drawing Sheets

METHOD FOR IMPROVING THE HANDING OVER A CONNECTION FROM ONE SGSN TO ANOTHER SGSN

This application is a continuation-in-part of Ser. No. 09/222,444 filed Dec. 29, 1998, abandoned.

CROSS-REFERENCES TO RELATED APPLICATIONS

This application for Patent claims the benefit of priority from, and hereby incorporates by reference the entire disclosure of, co-pending U.S. application for patent Ser. No. 09/222,444 filed Dec. 29, 1998 and Norwegian patent application No. 19976150, filed on Dec. 30, 1997.

BACKGROUND OF THE PRESENT INVENTION

1. Field of the Invention

The present invention relates to a method for improving the handing over of a connection from one SGSN to an-other, i.e. when an MS (Mobile Station) moves from one SGSN service area to another, and more specifically, the present invention relates to GPRS service on GSM.

BACKGROUND OF THE INVENTION

When a mobile station (MS) in an active GPRS modus, i.e. transmitting information, moves from one SGSN service area to another, the packet transmission and possible layer 3 procedures should not be interrupted. As is understood in the art, the layer 3 procedures relate to the seven layers of the ISO (International Standardization Organization) OSI (Open System Interconnect) model where layer 3 deals with network related signaling procedures. Network related procedures are procedures needed in order to have a functional communication network supporting, for example, mobility management in a mobile telephony system.

Due to the complex state machines for the layer 3 procedures, changing SGSN directly implies transmitting very large amounts of control data from one SGSN to another. Another problem is ongoing transactions with other network nodes which also has to be redirected to the new SGSN.

2. State of the Art

GSM voice service uses an anchor concept to solve the problem. That means that in the network node (SC/VLR) a connection is primarily established and is kept through-out the whole call. This node is entitled 'anchor MSC/VLR'. If the subscriber moves into another MSC/VLR's coverage area, the new MSC/VLR acts only as a transmit node. This node is entitled 'serving MSC/VLR' whereas the connection control still resides in the anchor MSC/VLR throughout the call.

3. Problems Related to Prior Art

GPRS has no working solution on this problem yet. Due to the long connection times for GPRS (hours) compared to a circuit switched connection (minutes), a similar solution for GPRS may result in a great number of anchor-serving legs.

OBJECTS OF THE INVENTION

An object of the present invention is to provide a method for improving the handing over of a connection from one SGSN to another, whereby the packet transmission and possible layer 3 procedures are not interrupted.

Another object of the present invention is to provide such a method by which the layer 3 procedures do not have to be designed for supporting inter SGSN routing area update.

Still another object of the present invention is to provide a method by which the tunneling of payload packets from one SGSN to another is not required, thereby simplifying the design necessary therefor.

Still another object of the present invention is to provide a method which optimizes the network utilization without adding complexity to SGSN.

Another object of the present invention is to provide a method by which the service degradation is minimized when handing over a connection from one SGSN to another as experienced from the MS point of view.

A more complete appreciation of the present invention and the scope thereof can be obtained from the accompanying drawings which are briefly summarized below, the following detailed description of the presently-preferred embodiments of the invention, and the appended claims.

SUMMARY OF THE INVENTION

In a method as stated in the preamble, the above objects are achieved by the features as stated in the enclosed patent claims.

In other words, the present method suggests that at inter SGSN routing area update, the old SGSN gets the role as a temporary anchor whereas the new SGSN works temporarily as a serving SGSN. This leg is kept as long as connection control procedures are processing including data packet transmission. When all activities have ceased for the connection, i.e. no data transmission, no layer 3 procedures and no on-going transactions towards other networks nodes, the connection control is moved from old to new SGSN.

The leg between old and new SGSN may be a Gb interface without or, alternatively, with minor modifications. Some control signaling is used to handle radio resources.

Further features of the present method will appear from the following description taken in conjunction with the appending drawings, as well as from the enclosed patent claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention relates to a method to "hand over" a connection from one SGSN to another without interrupting packet transmission and control signaling. The method allows the network to create a temporary leg between the old and the new SGSN. The temporary leg is maintained until the state of the connection in the old SGSN can be securely transferred to the new SGSN while at the same time redirecting packet transfer to go directly from/to the old SGSN to/from the new SGSN.

Figure 1A:
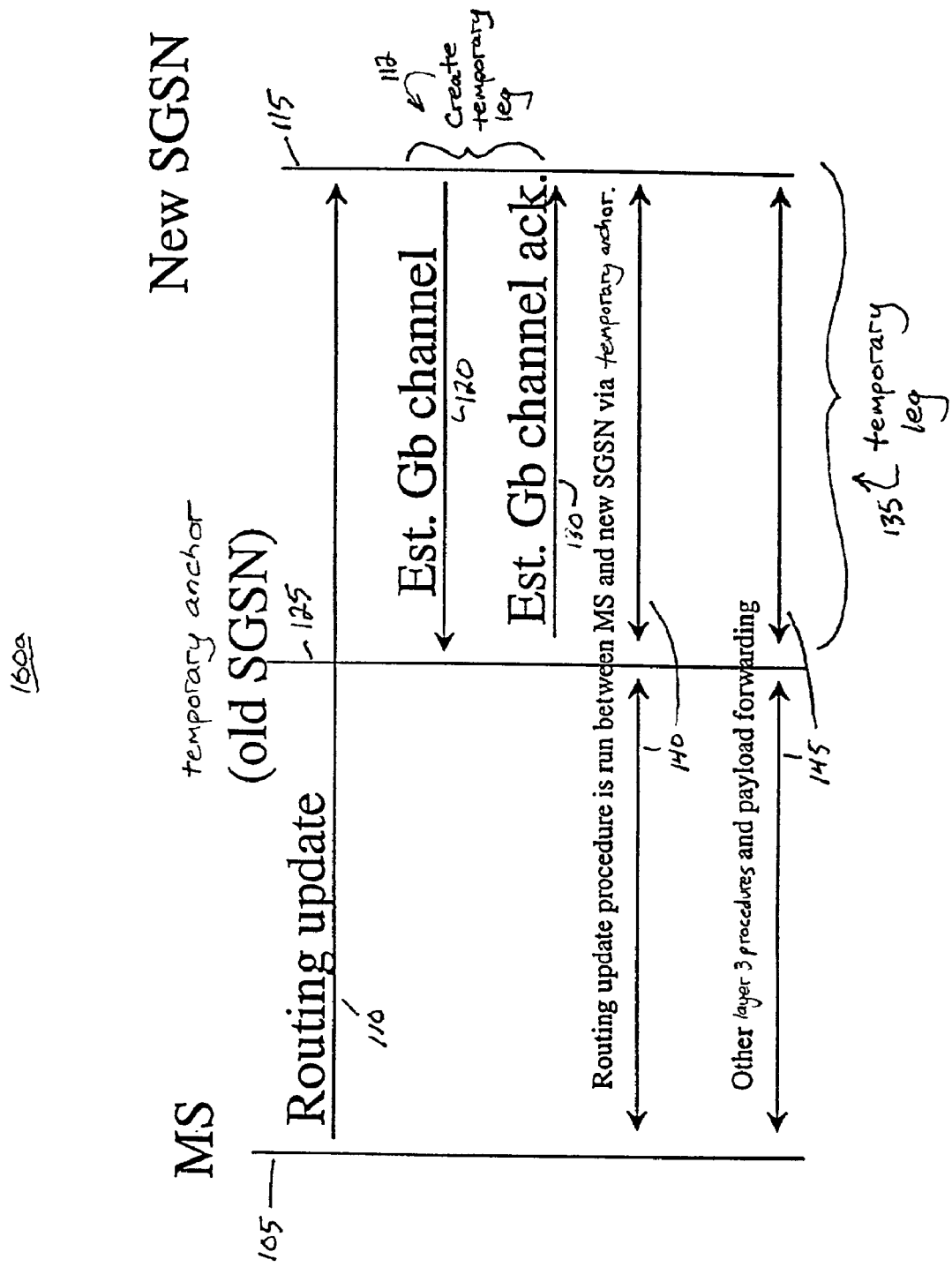
FIGS. 1A and 1B represent a first step of a signaling sequence of an inter SGSN routing area update.
Figure 1B:
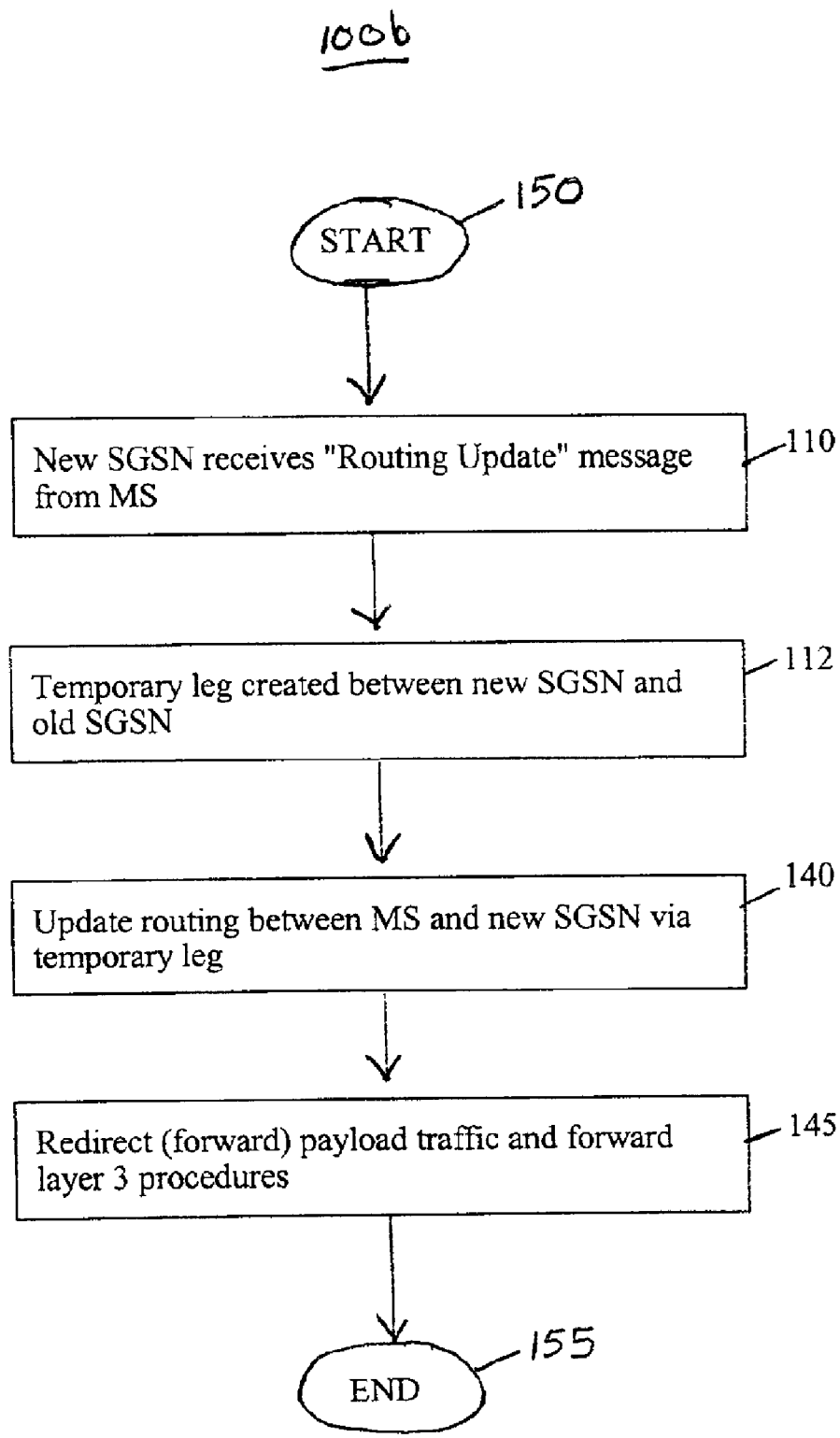
Figure 2A:
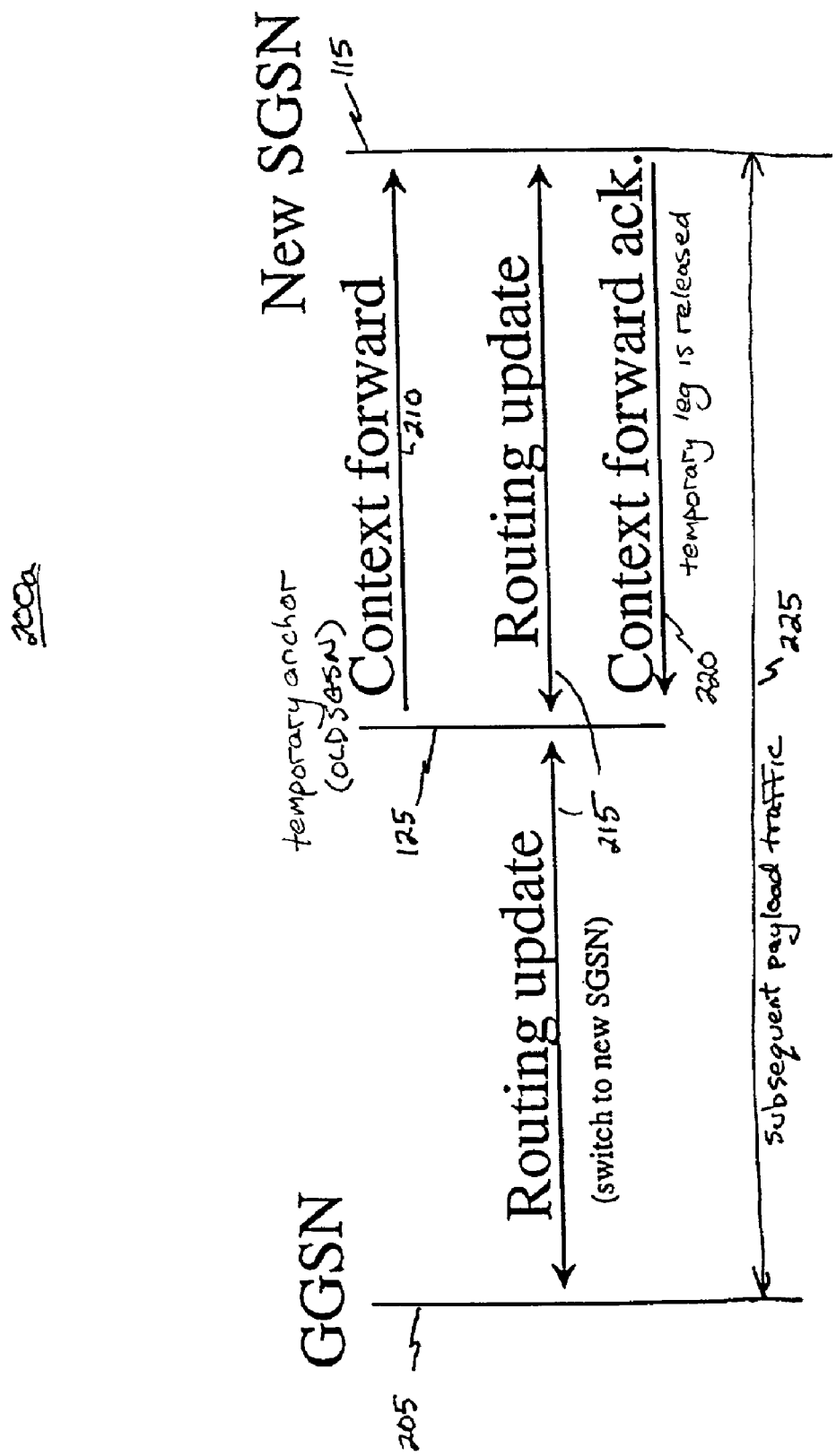
FIGS. 2A and 2B represent a second step of the signaling sequence of the inter SGSN routin area update of FIGS. 1A and 1B.
Figure 2B:
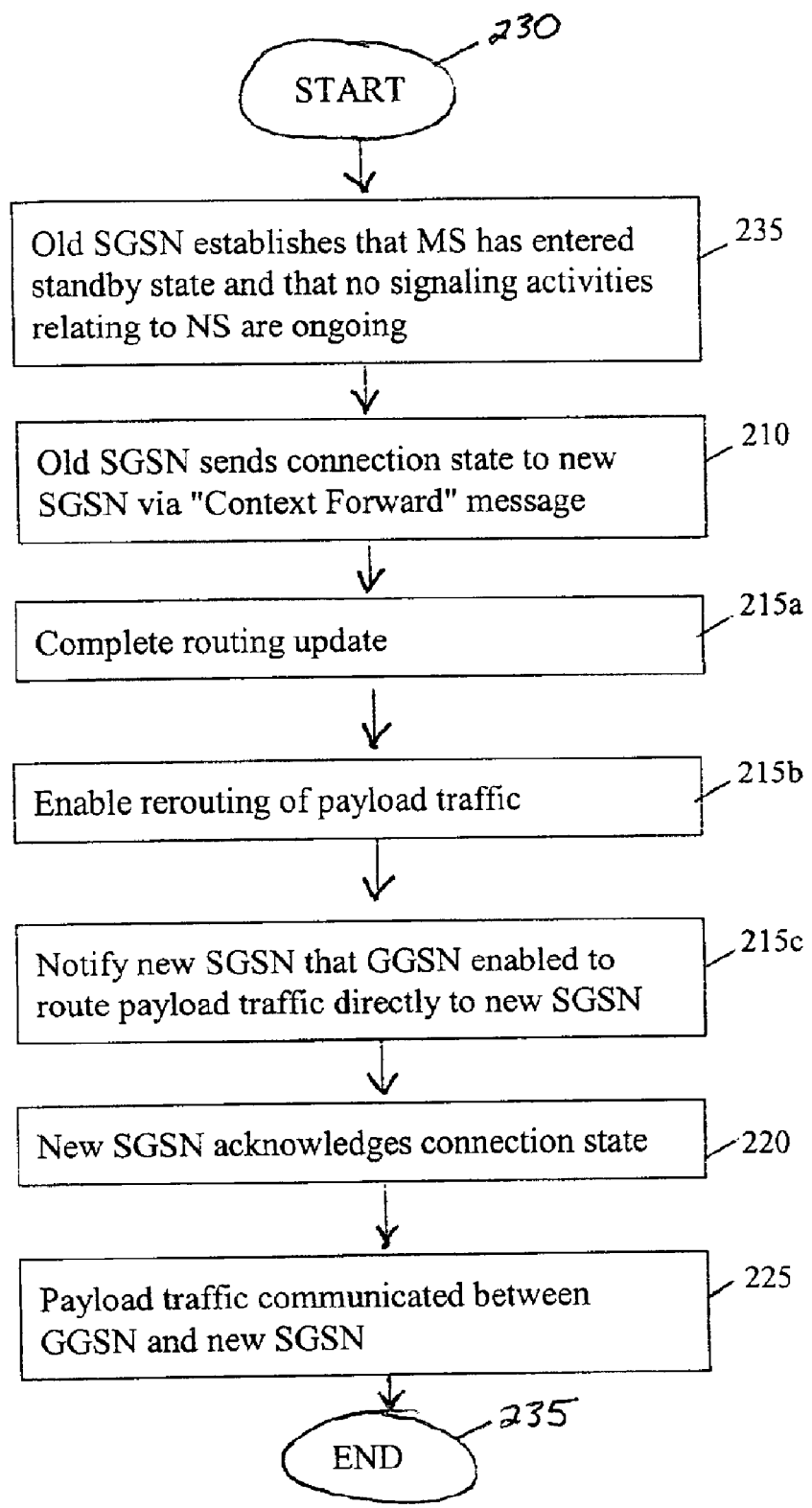

With reference to FIGS. 1A, 1B, 2A, and 2B, it is illustrated by means of a signaling sequence how the principle of an inter SGSN routing area update is carried out in two steps. FIGS. 1A, 1B represent a first step and FIGS. 2A, 2B represent a second step of the signaling sequence. It should be understood that intra and inter SGSN routing area updates are well known in GPRS systems as described in the ETSI specification "ETSI EN 301 344" (also known as "GSM 03.60").

This two-step construction does not impact on-going layer 3 procedures or payload transmission. Actually, the layer 3 procedures do not have to be designed to support inter SGSN routing area updates since the temporary Gb channel is not visible for layer 3. Today's solution in GPRS require that all layer 3 procedures must be designed to cater for inter SGSN routing area updates.

Since context take-over from an old (i.e., temporary anchor) to a new SGSN takes place when the connection has entered a standby state, the risk for losing payload packets is minimized. And since there is no traffic on-going, the tunneling of payload packets from the old to new SGSN is not required, thereby simplifying the design.

Using the old SGSN as a temporary anchor simplifies signaling between SGSN and external nodes since the connection of a GGSN to the old SGSN is allowed to finish up on-going transactions before moving the context to the new SGSN. For example, services, such as charging, may be completed towards a billing gateway in the normal manner before the context is moved to the new SGSN and charging is resumed. It should be understood that "charging" is a term well understood in the art and denotes functions in telecommunication nodes dealing with collecting of information relating to individual calls and sessions for later processing and production of customer bills.

Referring to FIGS. 1A, 1B, 2A, and 2B, exemplary signaling sequence layouts depicting the principles of how an inter SGSN routing area update is carried out in two steps 100a and 200a are illustrated. FIGS. 1A and 2A illustrate signaling sequence layouts in an interconnect format and FIGS. 1B and 2B are corresponding flow charts.

Referring to FIG. 1A, when a mobile station (MS) 105 moves from one SGSN service area to another, the MS 105 communicates an inter SGSN routing area update signal 110 to the new SGSN 115. A temporary leg 135 or Gb channel is created between the MS 105 and the new SGSN 115 via the old SGSN 125 by the new SGSN 115 communicating an "establish GB channel" signal 120 to the old SGSN 125 and the old SGSN 125 responding by communicating an "establish GB channel acknowledgment" signal 130 to the new SGSN 115. As such, the old SGSN 125 is given the role as temporary anchor while the new SGSN 115 is temporarily working as a serving SGSN. The inter SGSN routing area update procedure 140 is then performed. Packet transfer is redirected at 145, which includes other layer 3 procedures and payload data to be forwarded from the old SGSN 125 to the new SGSN 115 over the temporary leg 135. It should be understood that a Gb channel (i.e., interface) is well known GPRS terminology as described in the ETSI specification, "ETSI EN 301 344" (also known as "GSM 03.60") version 7.4.0, chapter 12.6.

Referring to FIG. 1B, a flow diagram 100b of the first step of a signaling sequence according to the signaling sequence layout 100a of FIG. 1A is shown. The signaling sequence 100b starts at step 150. At step 110, the new SGSN receives the "routing update message" from the mobile station (MS) 105. At step 112, a temporary leg 135 is created between the old and new SGSN by communicating the "Est. Gb channel" 120 and the "Est. Gb channel acknowledgment" 130 signals between the old 125 and new 115 SGSN.

At step 140, the routing update procedure is run between the MS 105 and the new SGSN 115 via the old SGSN 125. At step 145, the old SGSN 125 redirects (forwards) payload traffic received from a GGSN to the new SGSN 115 and vice versa. Additionally, at step 145, packet transfer is redirected, which includes the old SGSN 125 forwarding layer 3 procedures (i.e., mobility management (MM) signaling) and payload traffic (voice and data) received from the MS 105 to the new SGSN 115 and vice versa. At step 155, the process ends.

Referring to FIG. 2A, when the connection enters a standby state (e.g., when all activities, such as layer 3 procedures, data transmission or on-going transactions toward other networks nodes, have ceased), the connection is securely transferred to the new SGSN 115 by moving the context from the old SGSN (i.e., temporary anchor) 125 to the new SGSN 115 without impacting on-going layer 3 procedures or packet data transmission. The term "connection control" means to maintain communication paths in telecommunication networks, where each telecommunication node (e.g., telephony exchanges) along the communication path provide such mechanisms. When the communication path is changed during a communication session because of an inter SGSN routing area update in GPRS, the connection control is transferred from one SGSN to another in order to maintain the communication path.

To move the context from the old SGSN 125 to the new SGSN 115, the old SGSN 125 sends a "context forward" signal 210 to the new SGSN 115. An inter SGSN routing area update 215 between a gateway GPRS support node (GGSN) 205 and the new SGSN 115 is performed so as to switch to the new SGSN 115. The new SGSN 115 then sends a "context forward acknowledgment" signal 220 to the old SGSN 125, thereby enabling subsequent payload traffic to be communicated directly between the GGSN 205 and the new SGSN 115 without being forwarded or redirected through the old SGSN 125. The temporary leg 135 (e.g., Gb channel) between the old SGSN 125 and the new SGSN 115 may then be released 225. It should be understood that the old SGSN 125 stops collecting charging information at a time when no chargeable events occur and charging resumes in the new SGSN 115 when the connection control has been transferred.

Referring to FIG. 2B, a flow diagram 200b of the second step of a signaling sequence according to the signaling sequence layout 200a of FIG. 2A is shown. The signaling sequence 200b starts at step 230. At step 235, the old SGSN establishes that the MS has entered a standby state and that no signaling activities relating to the MS are on-going. The standby state is defined in ETSI specification "ETSI EN 301 344" (also known as "GSM 03.60"), version 7.4.0, chapters 6.1.3 and 6.2.1. It should be understood that the decision to go to the standby state is part of the connection control, which at this time is maintained in the old SGSN 125. Upon establishing that the MS is in a standby state and that signaling activities related to the MS 105 are not on-going, the old SGSN 125 sends a connection state to the new SGSN 115 via a "context forward" message at step 210.

The routing update of step 215 (FIG. 2A) is performed by three operations, 215a–215c. At step 215a, the new SGSN 115 initiates completion of the "routing update", which was originally initiated in the first step 100a (FIG. 1A). The new SGSN sends the "routing update" message to the old SGSN 125. At step 215b, the old SGSN 125 sends the "routing update" further on to the GGSN 205, which enables the GGSN 205 to route payload traffic to the new SGSN 115 thereafter. At step 215c, the new SGSN 115 is informed that the GGSN 205 has been enabled to route payload traffic directly to the new SGSN 115.

At step 220, the new SGSN 115 acknowledges receipt of the connection state by sending 220 the "context forward ack." message to the old SGSN 125. The "context forward ack." message implies that the new SGSN 115 has released the temporary leg 135 established in the first step (FIG. 1A) of the signaling sequence and the old SGSN 125 also releases the temporary leg 135 upon receiving the message. After the new SGSN 115 acknowledges the connection state, the payload traffic is communicated between the GGSN 205 and the new SGSN 115 at step 225. The second step 200b of the signaling sequence ends at step 235.

Figure 3:
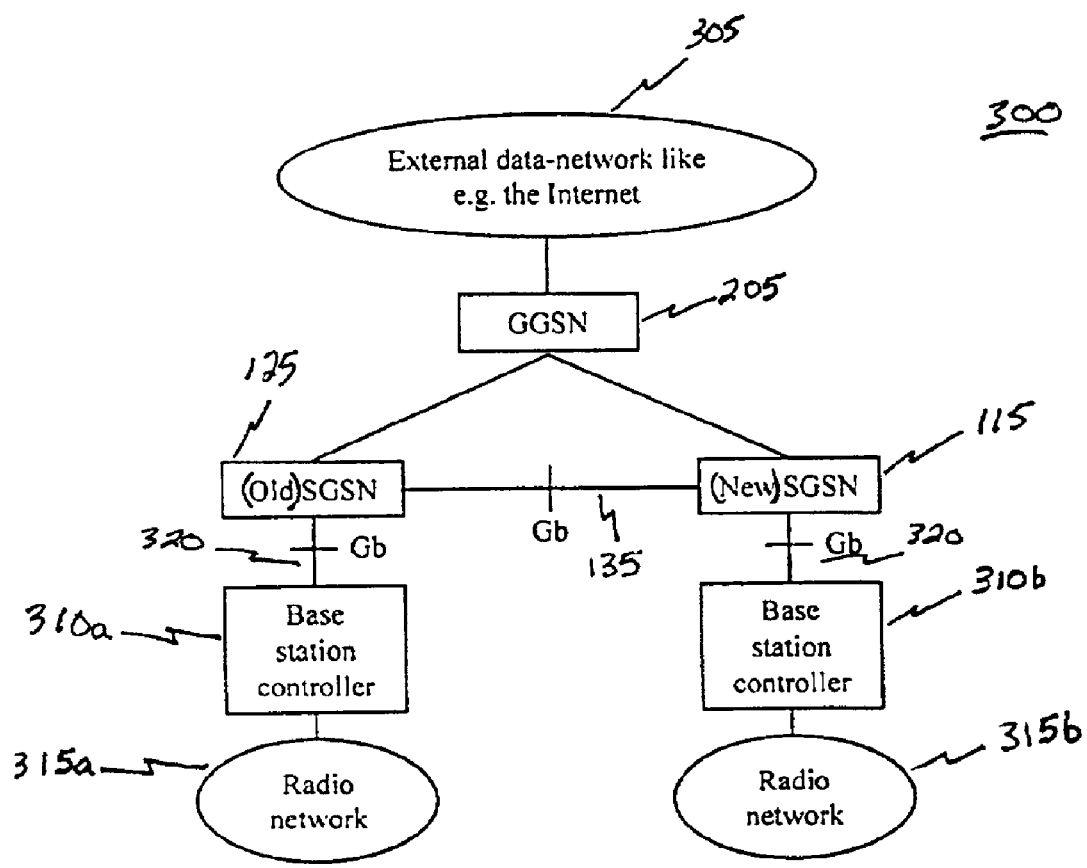
FIG. 3 is an exemplary block diagram of infrastructure of a communication network for supporting the signaling sequence according to FIGS. 1A, 1B, 2A, and 2B.

FIG. 3 is an exemplary block diagram of infrastructure of a communication network 300 according to the principles of the present invention. The GGSN 205 is connected to an external network 305, such as the Internet or a public switched telephone network (PSTN). The GGSN 205 further connects to at least two serving GPRS support nodes (SGSN) 125 and 115. A first SGSN 125 is connected to a base station controller 310a, which controls base stations (not shown) that communicate with mobile stations (not shown) within a radio network 315a. A first SGSN 115 is connected to a base station controller 310b, which controls base stations (not shown) that communicate with mobile stations (not shown) within a radio network 315b. Gb channels 320 couple the SGSNs 125, 115 to their respective base station controllers 310a, 310b.

The SGSNs 125 and 115 are termed "old" and "new", respectively, to exemplify a mobile station (MS) initially operating in the radio network 315a and traveling to and operating in the radio network 315b. While the MS 105 operates in the radio network 315a, the SGSN 125 handles the communication between the base station controller 310a and the GGSN 205. Upon the MS moving to operate within the radio network 315b, the SGSN 115 begins to handle the communication between the base station controller 310b and the GGSN 205. At the switchover between the old SGSN 125 and the new SGSN 115, a Gb channel 135 is created. The temporary leg or Gb channel 135 is established and operates as described in conjunction with FIGS. 1A–2B.

Merits of Invention

The solution optimizes the network utilization without adding complexity to SGSN. The subscriber does not experience any loss of service i.e., no retransmission peer to peer and no interrupted layer 3 procedures.

List of Abbreviations

GPRS - General Packet Radio Service
SGSN - Serving GPRS support node
GGSN - Gateway GPRS support node
MSC/VLR - Mobile Switching Center/Visitor Location Register

What is claimed is:

1. A method for handing over of a connection from a first serving GPRS support node (SGSN) to a second SGSN in response to an inter SGSN routing area update, the method comprising the steps of:

establishing a temporary leg between the first SGSN and the second SGSN;

responsive to the connection entering a standby state, operating the first SGSN as a temporary anchor in response to the inter SGSN routing area update finishing up ongoing transactions prior to moving context from the first SGSN to the second SGSN; and redirecting packet transmission and control signaling to and from the second SGSN via the first SGSN via the temporary leg while the first SGSN is operating as the temporary anchor.

2. The method of claim 1, further comprising the step of initiating the inter SGSN routing area update in response to a mobile station moving from a first SGSN service area associated with the first SGSN to a second SGSN service area associated with the second SGSN.

3. The method of claim 2 wherein the step of redirecting further comprises the step of redirecting the signaling traffic from the first SGSN to the second SGSN via the temporary leg.

4. The method of claim 2, wherein the step of establishing the temporary leg comprises the step of establishing a Gb channel between the first SGSN and the second SGSN.

5. The method of claim 2, further comprising the step of transferring connection control from the first SGSN to the second SGSN in response to the connection being maintained by the first SGSN entering a standby state.

6. The method of claim 5, wherein the step of transferring further comprises the step of performing the inter SGSN routing area update between a Gateway GPRS support node (GGSN) and the second SGSN.

7. The method of claim 5, wherein the step of transferring connection control is performed without interrupting layer 3 procedures and data transmission.

8. The method of claim 5, further comprising the step of releasing the temporary leg in response to completion of the transfer of connection control from the first SGSN to the second SGSN.

9. The method of claim 8, further comprising the step of communicating subsequent signaling traffic directly between a Gateway GPRS support node (GGSN) and the second SGSN without redirecting the subsequent signaling traffic via the first SGSN, the subsequent signaling traffic occurring after the release of the temporary leg.

10. The method of claim 5, further comprising the steps of:

allowing subscriber charging transactions to be completed towards a billing gateway before performing the step of transferring connection control to the second SGSN; and resuming subscriber charging towards the billing gateway in response to completion of the transfer of connection control to the second SGSN.

11. A system for handing over of a connection between at least two GPRS nodes in response to an inter SGSN muting area update, the system comprising:

a first SGSN operating as a temporary anchor in response to the inter SGSN routing area update, wherein the first SGSN, in response to the connection entering a standby state, allows ongoing transactions to finish up prior to moving context from the first SGSN; and a second SGSN in communication with the first SGSN, the first SGSN redirecting packet transmission and control signaling between the second SGSN and the first SGSN via a temporary leg while the first SGSN is operating as the temporary anchor.

12. The system according to claim 11, further comprising a mobile station operating in a first SGSN service area associated with the first SGSN, the inter SGSN routing area update being initiated upon the mobile station moving from the first SGSN service area to a second SGSN service area associated with the second SGSN.

13. The system of claim 12, wherein the redirecting further includes the step of redirecting the signaling traffic from the first SGSN to the second SGSN via the temporary leg.

14. The system of claim 12, wherein establishing the temporary leg comprises establishing a Gb channel between the first SGSN end the second SGSN.

15. The system of claim 12, further including transferring connection control from the first SGSN to the second SGSN in response to the connection being maintained by the first SGSN entering a standby state.

16. The system of claim 15, wherein the transferring further includes performing the inter SGSN routing area update between a Gateway GPRS support node (GGSN) and the second SGSN.

17. The system of claim 15, wherein transferring connection control is performed without interrupting layer 3 procedures and data transmission.

18. The system of claim 15, further comprising releasing the temporary leg in response to completion of the transfer of connection control from the first SGSN to the second SGSN.

19. The system of claim 18, further comprising communicating subsequent signaling traffic directly between a Gateway GPRS support node (GGSN) and the second SGSN without redirecting the subsequent signaling traffic via the first SGSN, the subsequent signaling traffic occurring after the release of the temporary leg.

20. The system of claim 19, further comprising:
allowing subscriber charging transactions to be completed towards a billing gateway before performing the step of transferring connection control to the second SGSN; and
resuming subscriber charging towards the billing gateway in response to completion of the transfer of connection control to the second SGSN.

21. A method for handing over of a connection between GPRS support nodes (SGSN), the method comprising the steps of:
receiving a routing update;
forming a temporary leg between an old SGSN and a new SGSN after receiving the routing update; and
responsive to the connection entering a standby state, operating the old SGSN as a temporary anchor in response to an inter-SGSN routing area update;
finishing up ongoing transactions prior to moving context from the old SGSN to the new SGSN; and
redirecting packet transmission and control signaling traffic across the temporary leg.

22. The method according to claim 21, further comprising:
releasing the temporary leg; and
communicating subsequent payload traffic between a GPRS and the new SGSN.

23. The method according to claim 21, wherein the old SGSN forms a temporary anchor.

24. The method according to claim 21, further comprising:
communicating a context forward message from the old SGSN to the new SGSN;
receiving a context forward acknowledgment from the new SGSN; and
releasing the temporary leg after receiving the context forward acknowledgment.

* * * * *

UNITED STATES PATENT AND TRADEMARK OFFICE
CERTIFICATE OF CORRECTION

PATENT NO. : 6,940,834 B2
APPLICATION NO. : 09/730877
DATED : September 6, 2005
INVENTOR(S) : Knut Bakke et al.

Page 1 of 1

It is certified that error appears in the above-identified patent and that said Letters Patent is hereby corrected as shown below:

In Column 6, Line 56, in Claim 11, delete "muting" and insert -- routing --, therefor.

In Column 7, Line 13, in Claim 14, delete "end" and insert -- and --, therefor.

Signed and Sealed this

First Day of January, 2008

JON W. DUDAS
*Director of the United States Patent and Trademark Office*